United States Patent
Reunamaki et al.

(10) Patent No.: US 11,473,944 B2
(45) Date of Patent: Oct. 18, 2022

(54) MEASUREMENT DEVICE WITH REMOTE AND LOCAL MEASUREMENTS

(71) Applicant: Nokia Technologies Oy, Espoo (FI)

(72) Inventors: Jukka Pekka Reunamaki, Tampere (FI); Arto Palin, Akaa (FI); Teemu Ilmari Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/766,608

(22) PCT Filed: Nov. 21, 2018

(86) PCT No.: PCT/EP2018/082085
§ 371 (c)(1),
(2) Date: May 22, 2020

(87) PCT Pub. No.: WO2019/101795
PCT Pub. Date: May 31, 2019

(65) Prior Publication Data
US 2020/0386584 A1    Dec. 10, 2020

(30) Foreign Application Priority Data
Nov. 24, 2017  (EP) .................................... 17203475

(51) Int. Cl.
*H04W 4/38* (2018.01)
*G01D 5/39* (2006.01)
(Continued)

(52) U.S. Cl.
CPC ................. *G01D 5/39* (2013.01); *G01P 15/18* (2013.01); *G06F 3/011* (2013.01); *H04W 4/38* (2018.02); *H04W 4/80* (2018.02)

(58) Field of Classification Search
CPC ...................................................... H04W 4/38
See application file for complete search history.

(56) References Cited

U.S. PATENT DOCUMENTS 5,727,065 A * 3/1998 Dillon ..................... G06F 21/10
348/E7.071
7,827,289 B2    11/2010 Bucher et al.
(Continued)

FOREIGN PATENT DOCUMENTS

| EP | 3073703 A1 | 9/2016 |
|----|-----------|--------|
| WO | WO-2010065886 A1 | 6/2010 |
| WO | WO-2015061001 A1 | 4/2015 |

OTHER PUBLICATIONS

European Patent Office, International Search Report and Written Opinion for PCT/EP2018/082085, dated Jan. 21, 2019, 14 pages.
(Continued)

*Primary Examiner* — Benyam Haile
(74) *Attorney, Agent, or Firm* — Mintz Levin Cohn Ferris Glovsky and Popeo, P.C.

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to receive remote activity information, the remote activity information comprising an indication of remote activity type, process the remote activity information with capability information relating to at least one of the apparatus and an application in the apparatus, and generate an action in at least one of the apparatus and the application as a response to the processing.

13 Claims, 6 Drawing Sheets

(51) Int. Cl.
  *H04W 4/80* (2018.01)
  *G01P 15/18* (2013.01)
  *G06F 3/01* (2006.01)

(56) References Cited

U.S. PATENT DOCUMENTS

| | | | |
|---|---|---|---|
| 8,744,804 | B2 | 6/2014 | Messenger et al. |
| 9,100,989 | B2 | 8/2015 | Ray et al. |
| 9,307,564 | B2 | 4/2016 | Kim et al. |
| 9,308,417 | B2 | 4/2016 | Grundy |
| 2004/0082343 | A1 | 4/2004 | Kim et al. |
| 2007/0197160 | A1 | 8/2007 | Health et al. |
| 2008/0085682 | A1 | 4/2008 | Rao |
| 2008/0162668 | A1 | 7/2008 | Miller |
| 2010/0167646 | A1 | 7/2010 | Alameh et al. |
| 2012/0316406 | A1 | 12/2012 | Rahman et al. |
| 2015/0301521 | A1 | 10/2015 | Byron et al. |
| 2015/0350752 | A1* | 12/2015 | Solomon .......... H04Q 9/04 340/870.01 |
| 2015/0375085 | A1* | 12/2015 | Molyneux .......... A63B 71/0605 2/22 |
| 2016/0250517 | A1 | 9/2016 | Tilvis et al. |
| 2017/0055869 | A1 | 3/2017 | Shin et al. |
| 2019/0101410 | A1* | 4/2019 | Kuper .......... G01D 1/10 |
| 2019/0143967 | A1* | 5/2019 | Kuti .......... G08G 1/162 701/23 |

OTHER PUBLICATIONS

European Patent Office, Supplemental Search Report for EP 17203475.3, dated Aug. 3, 2018, 12 pages.
Bryant, M. "Soundwave is a New Take on Sharing Your Music Tast on the Go, and Lets You discover What Others Are Listening to Around You," https://thenextweb.com/apps/2013/06/20/soundwave-is-a-new-way-to-discover-what-music-the-people-around-you-are-listening-to-and-share-your-taste-with-the-world/#.tnw_pydg5Uvy.
Bojinov, H. et al., "Mobile Device Identification via Sensor Fingerprinting," Research paper. https://crypto.stanford.edu/gyrophonr/sensor_id.pdf. (14 pages).

* cited by examiner

MEASUREMENT DEVICE WITH REMOTE AND LOCAL MEASUREMENTS

This application is a national-phase entry of Patent Cooperation Treaty Application No. PCT/EP2018/082085 filed Nov. 21, 2018, entitled "MEASUREMENT DEVICE WITH REMOTE AND LOCAL MEASUREMENTS," which claims priority to European Application No. 17203475.3 filed Nov. 24, 2017, entitled "ACTIVITY INFORMATION," the contents of which are hereby incorporated by reference in their entirety.

FIELD

The present invention relates to communication of information to at least one another apparatus.

BACKGROUND

Measuring physical properties may be performed using various methods and measurement devices. Different measurement devices have different capabilities, wherein measurement-enabled devices may further be enabled to communicate with other devices, such as other measurement devices. Similarly, media consumption devices may be enabled to communicate with further devices which are enabled to consume or present media content.

SUMMARY OF THE INVENTION

According to some aspects, there is provided the subject-matter of the independent claims. Some embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to receive a remote activity information, the remote activity information comprising an indication of remote activity type and remote measurement data, verify local measurement data and the remote measurement data to reflect a substantially same measured entity at least in part by calculating a correlation between the local measurement data and the remote measurement data, process the remote activity information with capability information relating to at least one of the apparatus and an application in the apparatus, and generate an action in at least one of the apparatus and the application as a response to the processing.

Various embodiments of the first aspect may comprise at least one feature from the following bulleted list:

- the remote activity information comprises remote measurement data, the capability information comprises an indication the apparatus is able to measure a substantially same property as was measured to generate the remote measurement data, and the apparatus is configured to trigger, responsive to the processing, a measurement of the same property to obtain local measurement data
- the apparatus is further configured to determine the local measurement data and the remote measurement data reflect a substantially same measured entity, and responsive to this being the case to display an indication provided in the message
- the apparatus is configured to verify the local measurement data and the remote measurement data reflect a substantially same measured entity at least in part by calculating a correlation between the local measurement data and the remote measurement data
- the apparatus is configured to obtain the local measurement data in a first measurement and the remote measurement data is a result of a second measurement, performed in a remote device, the second measurement being based on a different measurement principle than the first measurement
- the remote measurement data comprises at least one of the following: pulse measurement data and acceleration sensor data
- the remote activity type and a local activity type is vibration, a high correlation peak between the local measurement data and the remote measurement data relates to the measurement data of the same vibration, which is characterized by a frequency and, optionally, a vibration pattern
- an advertising part of a broadcast message from the remote device has an indication that it relates to the property of the apparatus
- timing data and measurement type data are un-encrypted whereas the remote measurement data is encrypted
- at least one of a distance and a phase of measurements of the physical property between the remote device and the apparatus is determined
- the local and remote measurements are of a substantially simultaneously time stamped measurements
- the indication of remote activity type comprises an indication of media content access in a remote device, and the capability information relating to the apparatus comprises information indicating whether the apparatus is capable of accessing the media content
- the media content comprises at least one of a music stream, a video stream and an emergency bulletin
- the apparatus is configured to provide an indication of the remote activity information to a user of the apparatus as a response to a determination that the apparatus is capable of accessing the media content
- the apparatus is further configured to provide the indication of the remote activity information to the user as a response to processing, in the apparatus, a plurality of messages from a plurality of remote devices, each of the plurality of messages comprising remote activity information indicating accessing a same media content item.

According to a second aspect of the present invention, there is provided a method comprising receiving, in an apparatus, remote activity information, the remote activity information comprising an indication of remote activity type and remote measurement data, verifying local measurement data and the remote measurement data to reflect a substantially same measured entity at least in part by calculating a correlation between the local measurement data and the remote measurement data, processing the remote activity information with capability information relating to at least one of the apparatus and an application in the apparatus, and generating an action in at least one of the apparatus and the application as a response to the processing.

Various embodiments of the second aspect may comprise at least one feature from the following bulleted list:

- the remote activity information comprises remote measurement data, the capability information comprises an indication the apparatus is able to measure a substantially same property as was measured to generate the remote measurement data, and the method further comprises triggering, responsive to the processing, a measurement of the same property to obtain local measurement data determining the local measurement data and the remote measurement data reflect a substantially same measured entity, and responsive to this being the case, displaying an indication provided in the message verifying the local measurement data and the remote measurement data reflect a substantially same measured entity at least in part by calculating a correlation between the local measurement data and the remote measurement data obtaining the local measurement data in a first measurement and the remote measurement data is a result of a second measurement, performed in a remote device, the second measurement being based on a different measurement principle than the first measurement the remote measurement data comprises at least one of the following: pulse measurement data and acceleration sensor data the indication of remote activity type comprises an indication of media content access in a remote device, and the capability information relating to the apparatus comprises information indicating whether the apparatus is capable of accessing the media content the media content comprises at least one of a music stream, a video stream and an emergency bulletin providing an indication of the remote activity information to a user of the apparatus as a response to a determination that the apparatus is capable of accessing the media content providing the indication of the remote activity information to the user as a response to processing, in the apparatus, a plurality of messages from a plurality of remote devices, each of the plurality of messages comprising remote activity information indicating accessing a same media content item.

According to a third aspect of the present invention, there is provided an apparatus comprising means for receiving, in the apparatus, remote activity information, the remote activity information comprising an indication of remote activity type and remote measurement data, means for verifying local measurement data and the remote measurement data to reflect a substantially same measured entity at least in part by calculating a correlation between the local measurement data and the remote measurement data, means for processing the remote activity information with capability information relating to at least one of the apparatus and an application in the apparatus, and means for generating an action in at least one of the apparatus and the application as a response to the processing.

According to a fourth aspect of the present invention, there is provided a non-transitory computer readable medium having stored thereon a set of computer readable instructions that, when executed by at least one processor, cause an apparatus to at least receive remote activity information, the remote activity information comprising an indication of remote activity type, process the remote activity information with capability information relating to at least one of the apparatus and an application in the apparatus, and generate an action in at least one of the apparatus and the application as a response to the processing.

According to a fifth aspect of the present invention, there is provided a computer program configured to cause a method in accordance with the second aspect to be performed, when run on a computing device.

According to a sixth aspect of the present invention, there is provided a system comprising an apparatus according to the first aspect, and a second apparatus configured to transmit the message comprising the remote activity information, the remote activity information comprising the indication of remote activity type, wherein the second apparatus is configured to perform the remote activity and to compile the message. The system may further comprise an entity measured in the remote activity, wherein the remote activity comprises a measurement.

EMBODIMENTS

By providing connectionless, for example broadcasted, messages, devices may share information on activities they engage in. The shared information may be used by other devices to align or coordinate activities performed by the respective devices, to obtain benefits which may include improved measurement accuracy, find erroneous devices or a more diverse measurement dataset, for example in case the devices have measuring capabilities which complement each other.

Figure 1:
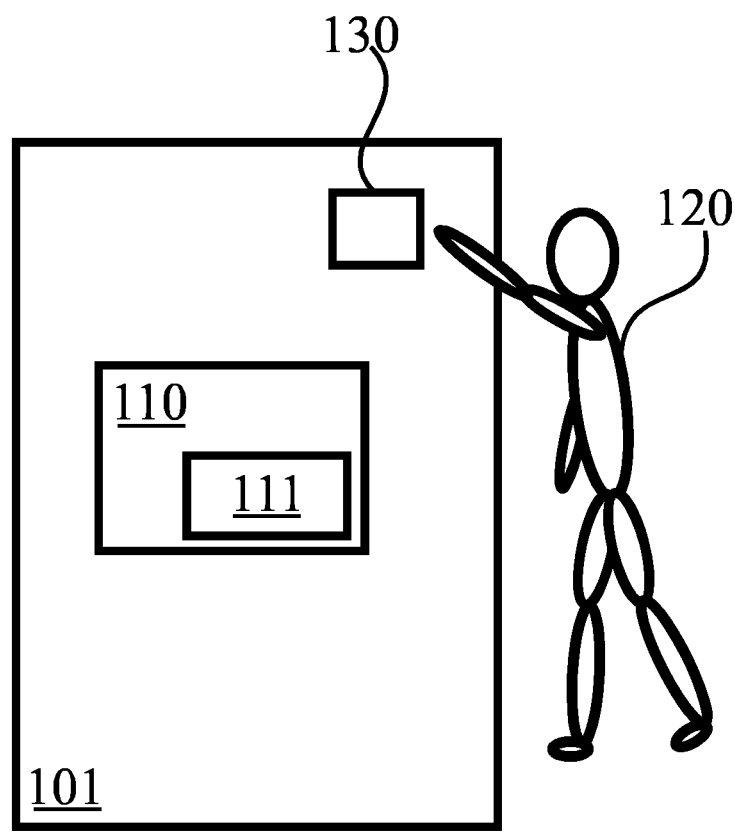
FIG. 1 illustrates an example system in accordance with at least some embodiments.

FIG. 1 illustrates an example system in accordance with at least some embodiments. Apparatus 101 may comprise, for example, an industrial device such as an engine, generator, radiation therapy device, a chemical or nuclear reactor vessel or a computer. In some embodiments, element 101 may correspond to a person, rather than an apparatus. Coupled with apparatus 101 is a display device 110, which is arranged to measure at least one physical or physiological property relating to apparatus 101.

Display device 110 may be configured to measure, for example, at least one of the following properties of apparatus 101: vibration amplitude, vibration frequency, temperature, internal pressure, emission of charged particles, emission of neutral particles, emission of x-rays, magnetic flux density outside apparatus 110 and an oscillation frequency of the magnetic flux density outside apparatus 110. Where a person takes the place of apparatus 101, display device 110 may be arranged to measure the person's pulse, for example.

Display device 110 comprises, or is interfaced with, a display 111. In some embodiments, a display 111 is absent. Display 111 may be a suitable type of display, such as a liquid-crystal display, LCD, or light-emitting diode, LED, display. Display device 110 may be configured to cause at least one measurement result obtained from measuring at least one property of apparatus 101 to be indicated on display 111, or, alternatively or additionally, the measurement result may be stored in a storage location, such as a cloud storage or a storage server. For example, display device 110 may indicate on display 111 a vibration frequency of apparatus 101, and, optionally, further information such as a safety limit relating to the displayed measurement result.

As a further example, a flux of neutrons leaving apparatus 101 may be indicated on display 111, along with an indication of an upper safe limit for a neutron flux. In case the measured flux is in excess of the safe limit, operators 120 may leave the room where apparatus 101 is operating, or shut apparatus 101 down to stop the neutron flux. In general, data produced by display device 110 when measuring apparatus 101 may be referred to as local measurement data.

In the system of FIG. 1, operator 120 has further furnished the system with unit 130. Unit 130 may be man-portable, for example the size of a tablet computer, although this is only a non-limiting example size. Unit 130 may be enabled to measure at least one property of apparatus 101. For example, unit 130 may be configured to measure a same property of apparatus 101 as display device 110 and at least one further property. When enabled, unit 130 begins measuring apparatus 101 to thereby obtain remote measurement data.

Once unit 130 is in possession of remote measurement data, it may begin transmitting advertising messages. Advertising messages may be transmitted from unit 130 in a connectionless manner, for example by broadcasting. Broadcasting refers to transmission of messages that are not addressed to any particular recipient node, but provided in a transmission medium to be picked up by suitably enabled nodes. Bluetooth low energy, UDP, and WiFi Aware are examples of solutions that support broadcasting, for example. The transmission of the advertising messages may take place over a short-range wireless communication technology, such as Bluetooth, for example, and/or the transmission may take place over an internet protocol network using NarrowBand IoT, NB-IoT, for example. When transmitting over an internet protocol network, the messages may be furnished with a location indication indicating the geographic location in which they are relevant, for example.

The advertising messages may comprise, at least partly, the remote measurement data and an indication of remote activity type describing the remote measurement data. The advertising messages may further include a result of a further measurement or determination made in unit 130. The indication of remote activity type may comprise, for example, a code identifying the measurement type performed by unit 130 to obtain the remote measurement data. The advertising message may further include an indication of a type of the further measurement or determination. The advertising messages may thus comprise data resulting from two different measurements of apparatus 101. The advertising messages may thus comprise two indications of type of the two different measurements. The remote measurement data, the result of the further measurement and the two type indications may collectively be comprised in remote activity information, which is comprised in the advertising message. The remote activity information may further comprise timing information relating to a time instant when at least one of the measurements is conducted, started or ended.

In general, display device 110 and unit 130 may be comprised in an Internet of Things, IoT, network. An IoT network may be based on internet protocol version 6, IPv6, addressing, for example. An IoT network may comprise a short-range wireless subnetwork.

Display device 110 may monitor for advertising messages, for example by monitoring a communications medium or network for broadcasted messages. Once display device 110 successfully receives an advertisement message from unit 130, it may determine whether display device 110 is capable of performing a measurement of the type indicated as the type of the remote activity in the advertising message. Once display device 110 receives one advertisement message, it may receive subsequent ones as well, if one assumes unit 130 transmits them repeatedly at a fixed period, for example.

In case display device 110 determines it is capable of performing a similar measurement as was performed by unit 130 to obtain the remote measurement data, display device 110 may obtain local measurement data of the same type. In case display device 110 was already configured to perform such a measurement when the advertisement message was received in display device 110, such local measurement data may be retrieved from a memory of display device 110, for example. In case display device 110 was not actively performing a measurement of the type indicated in the advertisement message, display device 110 may trigger a measurement of the type indicated, to thereby obtain local measurement data of the type indicated.

Once display device 110 is in possession of local measurement data of the indicated type, display device 110 may compare the local measurement data to the remote measurement data from the advertising message, wherein the local and remote measurement datasets may be compared concerning a substantially same time of measurement. In case display device 110 triggers a measurement of the indicated type responsive to receipt of the advertising message, display device 110 may obtain remote measurement data from a subsequent advertising message, which will be measured substantially simultaneously with the measurement triggered in display device 110 as a response to the first advertisement message.

In case display device 110 determines, based on the comparison of the local measurement data to the remote measurement data, that the local and remote measurement datasets are observations of the same entity, for example apparatus 101, display device 110 may consider unit 130 as measuring the same entity as it itself does.

The comparison may be based, for example, on a correlation measurement. In case the correlation exceeds a threshold, display device 110 may consider the datasets to be of the same entity. For example, in case the indicated measurement type is vibration, there will be a high correlation peak between the datasets in case they are measurements of the same vibration, which is characterized by a frequency and, optionally, a vibration pattern. A vibration pattern may comprise, for example, a strong vibration pulse followed by one weaker vibration pulse and then another strong pulse, the strong and weak pulses alternating. A correlation measurement may be seen as one kind of measurement, which is enabled in display device 110 as a response to the advertising message.

As another example, where the measurement type is a human pulse, a pulse is characterized by a pulse interval and, optionally, features of a pulse shape, whereby it is possible to determine, using for example a correlation function, whether the datasets are measured from the same person. In one embodiment, to state that the datasets are measured from the same person the correlation function needs to take into account that the pulse shape between local and remote measurement may be in different phase, as the same shape characteristic may be delayed or advanced with respect to another measurement as the distance from a source of the same physical property, where measured, is different, affecting measurement timing.

The correlation function is not the only way to determine, whether the local and remote measurement data are obtained from the same entity. For example, a more analytical comparison of the measurement datasets may be employed. In the example of a human pulse, the pulse interval and technical characteristics of the pulse shape, such as QRS complex features, may be extracted from the data and compared between the local and remote datasets, to determine whether they reflect the pulse of the same person. For example, one pulse measurement capable unit may be attached to the person's chest and another to his wrist.

In case display device 110 is able to determine the local measurement data and the remote measurement data reflect measurements of the same entity, display device 110 may provide on display 111 an indication of the result of the further measurement or determination made in unit 130. This further measurement may be of a type display device 110 is not enabled to make itself. Therefore, providing a display of it on display 111 enhances the situational awareness operators 120 have of apparatus 101, concerning the prevailing technical state of apparatus 101.

On the other hand, unit 130 may lack a display and thus means for indicating this information to a user. In some cases, unit 130 may have a display, but this may be poorly visible from the place where unit 130 is located. An indication on display 111 of the further measurement in unit 130 may also serve to verify that unit 130 is properly attached to apparatus 101. In some embodiments, display device 110 may further be configured to perform an averaging of the local measurement data and the remote measurement data, to improve the accuracy of the measurement which both display device 110 and unit 130 are capable of performing. Where display 111 is present, the average may be provided to display 111 for indication to human operators.

In some embodiments, display device 110 is configured to transmit to unit 130 a request message, for example requesting unit 130 provide the further measurement at a periodicity that is specified in the request message. In some embodiments, the advertising message further comprises indications of measurements unit 130 is enabled to perform, but which were not performed before generating the advertisement message. For example, the measurement sensors for these measurements may be switched off in unit 130. In this case, display device 110 may request in the request message that at least part of these measurements are conducted, and the thus obtained measurement data be transmitted to display device 110 in advertisement messages.

Display device 110 may be furnished with information concerning measurements it cannot make, but which would support measurements it can make. Thereafter, in case display device 110 is informed, via an advertising message, that unit 130 is able to perform such a measurement and in case display device 110 can confirm it and unit 130 are measuring the same entity, display device 110 may request unit 130 to perform such a measurement and to provide results thereof to display device 110.

Examples of measurement that may support measurements of display device 110 include neutral particle emission in case display device 110 can measure charged particles, since knowledge of neutral particle emission in that case assists in building a more complete understanding of reactions taking place in apparatus 101. A further example of a measurement that may support measurements of display device 110 is a temperature measurement in case display device 110 can measure vibration, since knowledge of temperature may enable display device 110 to, together with the vibrational data, assess the operational mode of apparatus 101.

The measurements of a same entity leading to comparable local and remote measurement datasets need not be based on the same technical principles, as long as they measure the same physical property. For example, vibration may be measured using vibration or acceleration sensors built around diverging physical principles, such as piezoelectric or microelectromechanical technologies. A further example is pulse measurement, where a person takes the place of apparatus 101. One pulse measurement may be based on an electrical measurement, such as electrocardiography, ECG, and another pulse measurement may be based on an optical measurement, such as a photoplethysmogram, PPG. The resulting pulse patterns may be correlated with each other to determine, whether the measurements are of the same person. Furthermore the distance from source of same physical property may need to be taken into account and analysed, so that the time of the first measurement and second measurements are about the same phase.

The remote measurement data may, in some embodiments, be encrypted in unit 130 with a key that is derived from the measured physical property using a pre-defined process. Thus display device 110 may be enabled to derive the key from measuring the same physical property, to decrypt the remote measurement data. The key as such is not included in the advertising message, rather, timing data and measurement type data may be included in un-encrypted form to enable display device 110 to determine, which measurement data needs to be used to derive the encryption key. This is useful, for example, where the measurement is private in nature, reflecting a person's bodily functions. However, some other measurements may also benefit as data could be also critical, if not protected.

Figure 2:
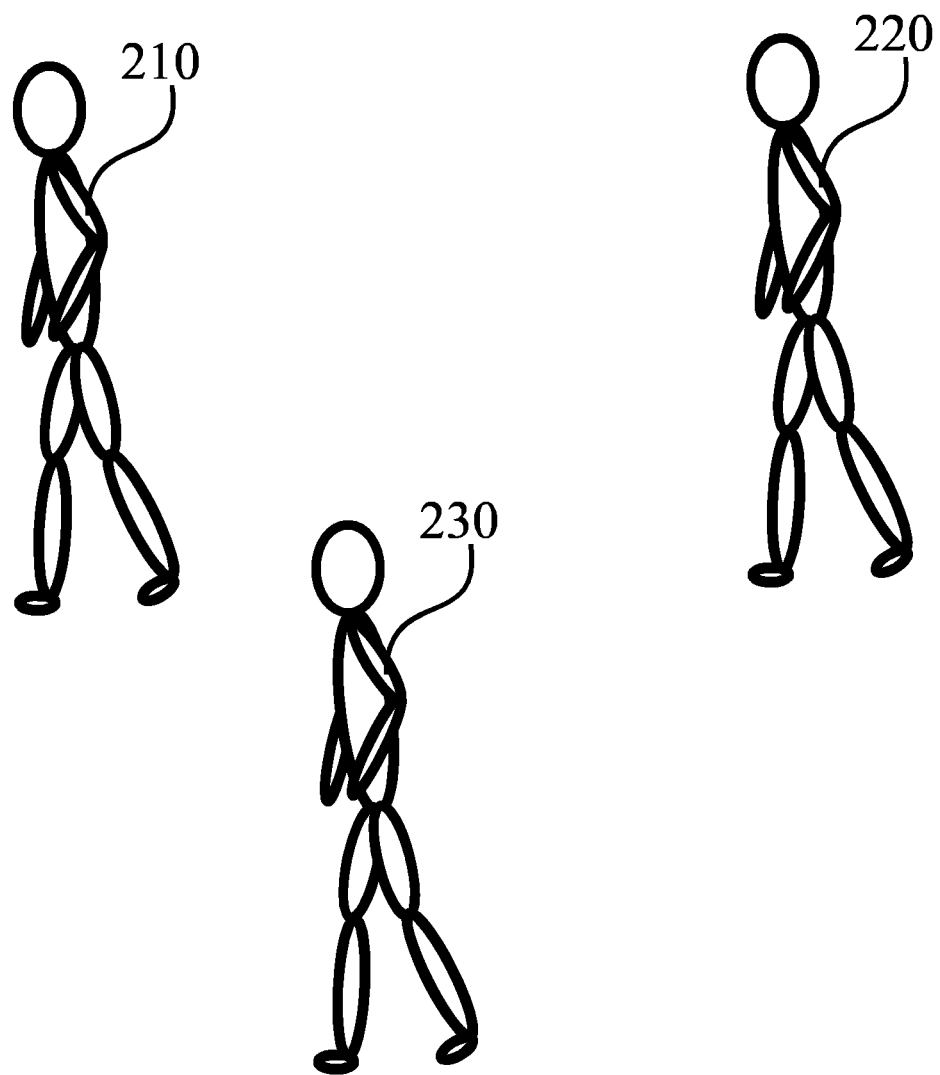
FIG. 2 illustrates an example system in accordance with at least some embodiments.

FIG. 2 illustrates an example system in accordance with at least some embodiments. In the system of FIG. 2, three persons 210, 220 and 230 each have a personal device, which are not illustrated in the figure for the sake of clarity. The devices will hereafter be referred to as device 210, device 220 and device 230 for brevity.

In the embodiments of FIG. 2, device 210 may receive advertisement messages from peer devices 220 and/or 230. The advertisement messages may comprise remote activity information, which in these embodiments may comprise an indication of media content access in the peer device. For example, the indication may comprise a link to a media stream, such as music or video stream, or to an emergency bulletin. The link may take the form of a uniform resource locator, URL, a uniform resource name, URN, a hash and/or a vendor-specific identifier, for example. The link may comprise a timestamp into the media content, to enable starting media playback at a position that is synchronized with playback in the peer device. The advertisements may be transmitted connectionless, such as broadcasted, over local and/or wireless networks, as described above in connection with FIG. 1.

Device 210 may, responsive to receiving the advertisement message, determine whether it is capable of accessing the media content indicated in the advertisement message. Responsive to a determination device 210 is able to access the content, an indication may be provided to the user querying, if he'd like to access the media content. If the used indicates such a willingness, the indicated media content may be started, or added to a playlist of device 210.

In case the user of device 210 enjoys the media content, he may provide a positive feedback to a media content server providing the content. In this case device 210 may begin advertising the same media content, potentially creating a local cascade of playback of the same media content.

Device 210 may be configured to determine, if more than a threshold number of advertising messages have been received from peer devices in a set time period, these advertising messages comprising indications the peer devices are accessing the same media content, for example an emergency bulletin. Device 210 may in such a situation be configured to access the same media content. A benefit of this is that the user may be made aware of an emergency bulletin he might otherwise miss.

Figure 3:
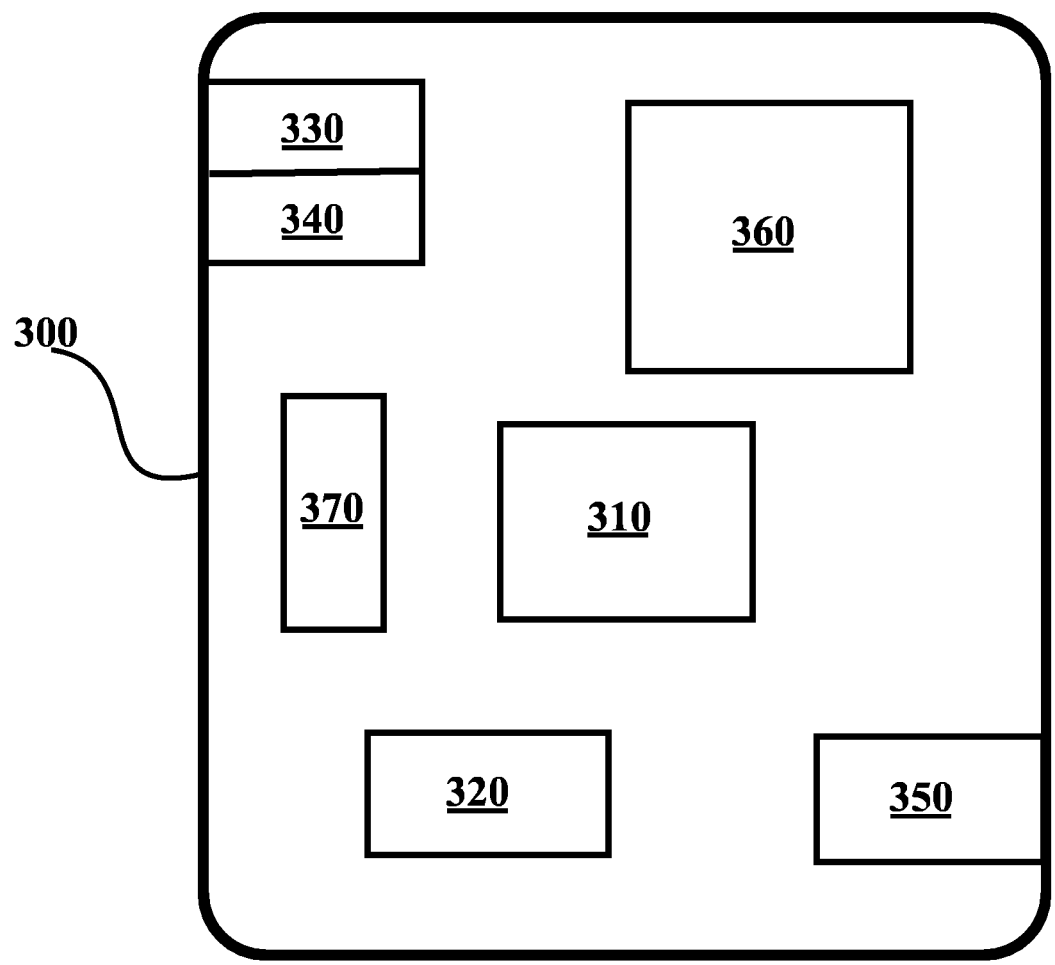
FIG. 3 illustrates an example apparatus capable of supporting at least some embodiments.

FIG. 3 illustrates an example apparatus capable of supporting at least some embodiments. Illustrated is device 300, which may comprise, for example, a device such as display device 110 or unit 130 of FIG. 1 or device 210 of FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, NB-IoT, IS-95, wireless local area network, WLAN, Ethernet and/or worldwide interoperability for microwave access, WiMAX, standards, for example.

Device 300 may comprise a near-field NFC, or short-range communication, transceiver 350. Transceiver 350 may support at least one NFC technology, such as NFC, Bluetooth, ZigBee, Z-wave, or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to control measurements or media content playback.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. At least one sensor such as an accelerometer, magnetometer, gyroscope or ECG sensor, for example, are examples of such further devices which may be comprised in device 300. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
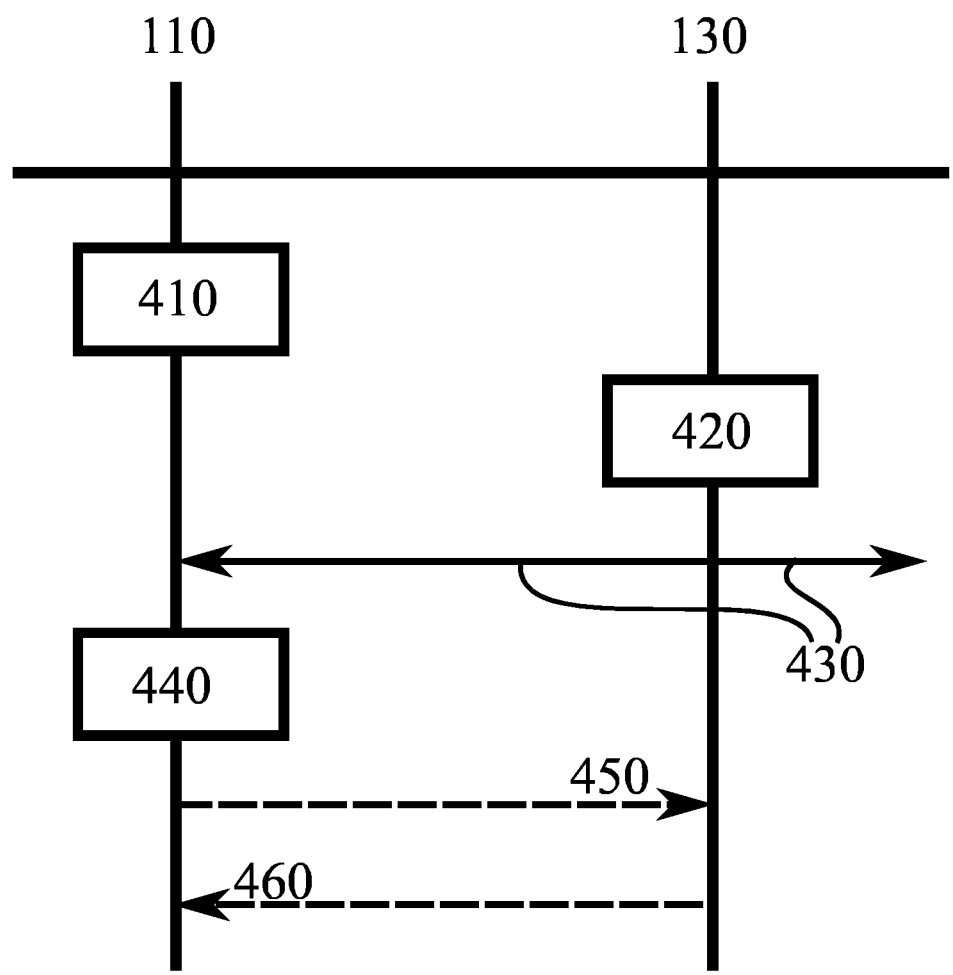
FIG. 4 illustrates signalling in accordance with at least some embodiments.

FIG. 4 illustrates signalling in accordance with at least some embodiments. On the vertical axes are disposed, on the left, display device 110 of FIG. 1, and on the right, unit 130 of FIG. 1. Time advances from the top toward the bottom.

In phase 410, display device 110 measures apparatus 101 of FIG. 1 and, optionally, displays an indication of measurement results obtained in the measuring. The measuring and displaying may be continuous in nature. In phase 420, an operator adds unit 130 to the system, without necessarily configuring it or display device 110 to be aware of each other. Unit 130 begins measuring apparatus 101, using a measurement capability of unit 130.

In phase 430, unit 130 transmits an advertisement message, as has been described herein above. The transmission may be connectionless, for example broadcasted. Broadcasting is schematically illustrated in FIG. 4 by the arrows progressing in both directions from unit 130. The connectionless nature of the transmission is, in general, not a mandatory element of the present disclosure. A benefit of the connectionless transmission is that power consumption may be reduced as no specific connection is needed. Display device 110 is able to receive the message.

In phase 440, display device 110 determines, whether display device 110 is capable of measuring the same physical property as unit 130 measured to obtain the remote measurement data which is in the advertisement message. For example, display device 110 may determine this by comparing capability information of display device 110 to a remote activity type indication comprised in the advertisement message. Responsive to display device 110 determining it is capable of measuring the same physical property, display device 110 may determine whether unit 130 and display device 110 itself are measuring the same entity. This determination may be based on measuring a correlation between local measurement data obtained in display device 110 and remote measurement data obtained from the advertisement message of phase 430, as described above.

Responsive to determining display device 110 and unit 130 are measuring the same entity, display device 110 may visually indicate on a display, and/or store, a further measurement indication provided in the advertisement message, the further measurement relating to the same entity and being a measurement display device 110 is not enabled to make itself. The advertisement message may comprise a type of the further measurement, which may also be displayed in the display along with the further measurement value.

Phases 450 and 460 are optional. In phase 450, display device requests unit 130 to perform a measurement that is indicated in the advertisement message as a measurement unit 130 can perform, but which was not performed before transmitting the advertisement message. Phase 460 is a further advertisement message which also comprises remote measurement data from the measurement requested in phase 450.

In one embodiment display device 110 can utilize advertising messages from unit 130 if unit 130 sends a broadcast message which has an indication that it relates to a same physical property as display device 110. Thus when there are one or more additional devices which are also broadcasting measurement results, the one or ones which relate to measurements of the same entity can start the comparing. Further, in some embodiments, the measurements can be sent from unit 130 one by one using broadcast messaging and display device 110 can utilize the message information. This is the case when, for example, the measurements need to be checked periodically.

In one embodiment, unit 130 may have in memory fifteen former measurements, for example, and unit 130 is configured to transmit data periodically, scheduled, or in alternative times or intervals or within 3 ms, for example each packet including five or a group of last measurements and the time stamp. An application or application manager in unit 130 may construct the packet with time stamp information. When the recipient receives the packet comprising the time stamp and the five or a group of last measurements in its application or application manager and finds the data with the timestamp information valid for processing. Thus the recipient can synchronize measurements. Correlation may be done timely as both devices have the same five or a group of last measurements with time stamps stored.

Figure 5:
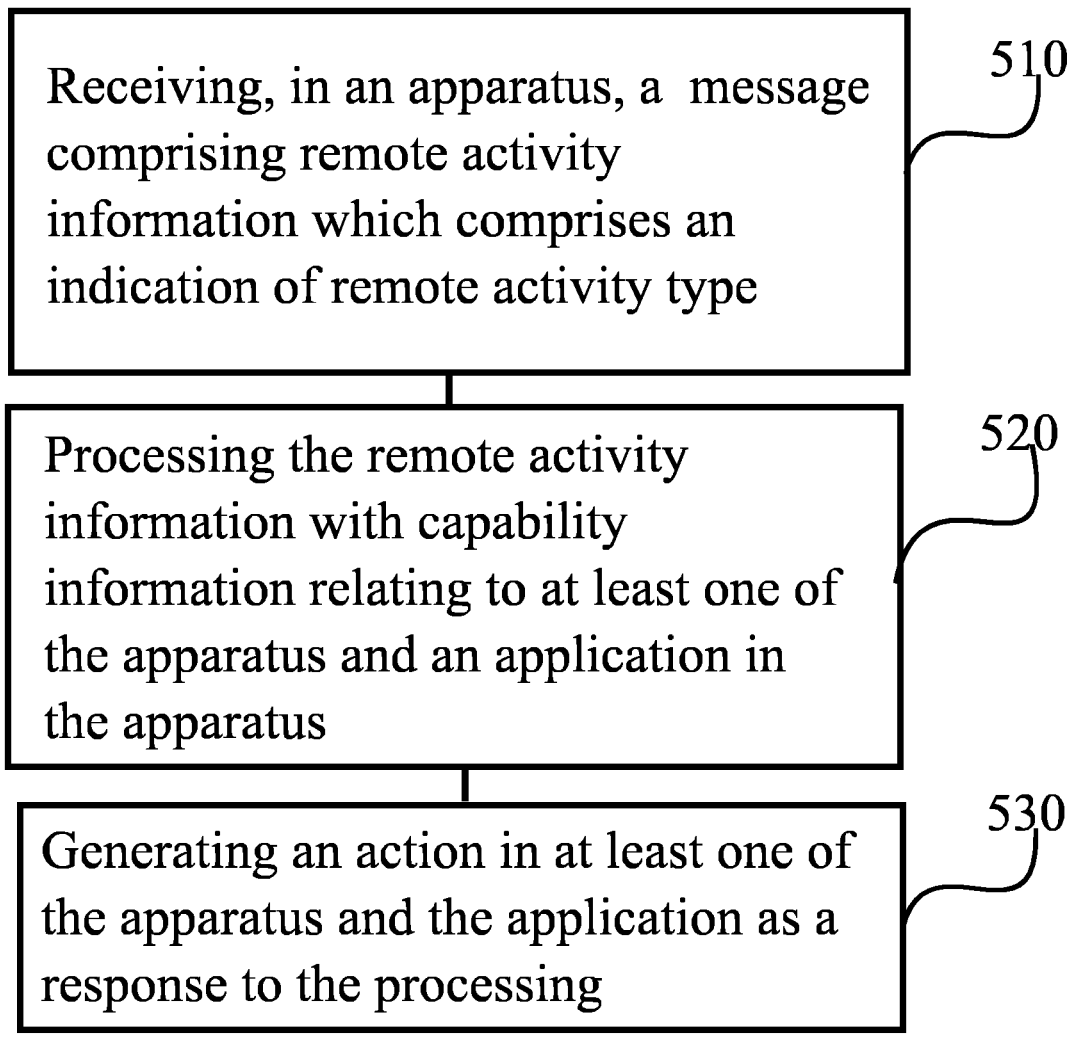
FIG. 5 is a flow graph of a method in accordance with at least some embodiments.

FIG. 5 is a flow graph of a method in accordance with at least some embodiments. The phases of the illustrated method may be performed in display device 110, or in a control device configured to control the functioning thereof, when installed therein.

Phase 510 comprises receiving, in an apparatus, a message comprising remote activity information, the remote activity information comprising an indication of remote activity type. Phase 520 comprises processing the remote activity information with capability information relating to at least one of the apparatus and an application in the apparatus, and phase 530 comprises enabling an action in at least one of the apparatus and the application as a response to the processing. The processing may comprise comparing, for example. The action may comprise a measuring or playback action, for example. Generating an action may comprise enabling an action, or causing the action to take place, for example. Action may comprise testing a new measuring method, checking whether the measurement resulting to correct results or to facilitate calibration of device, for example remote device, and improving those.

Figure 6:
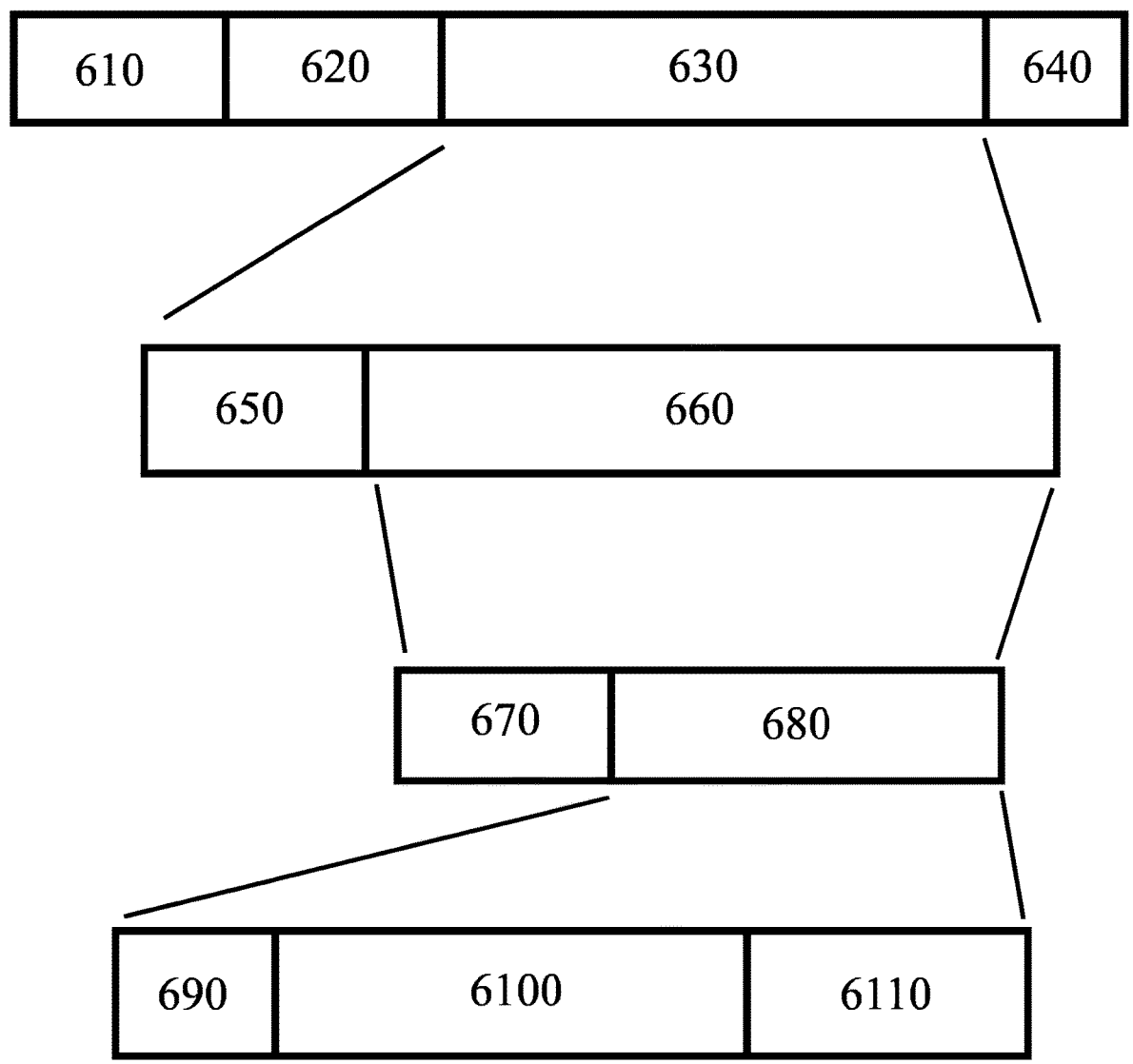
FIG. 6 illustrates an example advertisement message in accordance with at least some embodiments.

FIG. 6 illustrates an example advertisement message in accordance with at least some embodiments. The example of FIG. 6 is in accordance with the Bluetooth Low Energy standard.

Block 610 comprises a preamble of 1 or 2 octets. Block 620 comprises an access address of 4 octets. Block 630 comprises a packet data unit, PDU, of 2 to 257 octets and block 640 is a cyclic redundancy check, CRC, of 3 octets.

In the PDU 630, block 650 is a header of 16 bits, and block 660 is a payload of 1-255 octets. In the payload 660, block 670 is an AdvA block of 6 octets and block 680 is an AdvData block of 0-31 octets. Inside the AdvData block, block 690 comprises other AdvData, block 6100 comprises measurement information and block 6110 comprises additional information.

According to one embodiment there is provided a non-transitory computer readable medium having stored thereon a set of computer readable instructions that, when executed by at least one processor, cause an apparatus to at least receive a message comprising remote activity information, the remote activity information comprising an indication of remote activity type, process the remote activity information with capability information relating to at least one of the apparatus and an application in the apparatus, and generate an action in at least one of the apparatus and the application as a response to the processing.

The described embodiments help e.g. to compare sensed data from different devices and in some circumstance to detect the right device to communicate from among devices sending wireless advertising messages.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in coordinating measurement results and providing more detailed measurements and may enhance and compare quality of measurements.

Acronyms List

ECG Electrocardiography
IoT Internet of Things
IPv6 Internet protocol version 6
LCD liquid-crystal display
LED light-emitting diode
NB-IoT narrow band internet of things
PPG photoplethysmogram
URL uniform resource locator
URN uniform resource name

REFERENCE SIGNS LIST

| | |
|---|---|
| 101 | Apparatus |
| 110 | Display device |
| 111 | Display |
| 120 | Operator |
| 130 | Unit |
| 210, 220, 230 | Devices |
| 300-370 | Structure of the device of FIG. 3 |
| 410-460 | Phases of the method of FIG. 4 |
| 510-530 | Phases of the method of FIG. 5 |
| 610-6110 | Data structures of FIG. 6 |

The invention claimed is:

1. An apparatus comprising:
at least one processor;
at least one memory including computer program code, the at least one memory and the computer program code being configured to, with the at least one processor, cause the apparatus at least:
receive, from a remote measurement device and via a broadcast message, remote activity information, the remote activity information comprising an indication of remote activity type and remote measurement data relating to a property of an entity, the broadcast message not being addressed to any particular recipient node;
in response to receipt of the broadcast message and a determination that a same property as the property indicated in the broadcast message can be performed by the apparatus, trigger a measurement of the same property to obtain a local measurement data;
calculate a correlation between the local measurement data relating to the property of the entity and the remote measurement data to verify the local measurement data and the remote measurement data are both measuring a same measured entity and the same property;
process the remote activity information with capability information relating to at least one of the apparatus and an application in the apparatus to determine whether at least one of the apparatus and the application are able to measure the same property of the same measured entity as the remote measuring device; and
generate an action in at least one of the apparatus and the application as a response to the processing.

2. The apparatus according to claim 1, wherein the apparatus is configured, in response to the processing determining the same property of the same measured entity as the remote measuring device, to obtain additional local measurement data by at least measuring the same property.

3. The apparatus according to claim 1, wherein the remote activity type is a vibration, wherein a high correlation peak between the local measurement data and the remote measurement data relates to measurement data of the same vibration, which is characterized by at least one of a frequency, a vibration pattern, and a pulse shape.

4. The apparatus according to claim 3, wherein the apparatus is configured to obtain the local measurement data in a first measurement and the remote measurement data is a result of a second measurement received from the remote measurement device, the second measurement being based on a different measurement principle than the first measurement.

5. The apparatus according to claim 4, wherein the remote measurement data comprises at least one of a pulse measurement data, the local measurement data, and an acceleration sensor data of the same property of the same entity.

6. The apparatus according to claim 5, wherein the property is a physical property and wherein at least one of a distance and a phase of measurements of the physical property between the remote measurement device and the apparatus is determined.

7. The apparatus according to claim 1, wherein the remote activity information is received as a broadcast message.

8. The apparatus according to claim 7, wherein an advertising part of the broadcast message includes an indication relating to a measured property of the apparatus.

9. The apparatus according to claim 7 wherein a timing data and a measurement type data in the broadcast message are un-encrypted, wherein the remote measurement data is encrypted.

10. The apparatus according to claim 1, wherein the local measurement data and the remote measurement data include same last measurements with time stamps.

11. The apparatus of claim 1, wherein the correlation between the local measurement data relating to the property of the entity and the remote measurement data further comprises a correlation between pulse patterns contained in the remote measurement data and the local measurement data.

12. A method comprising:
receiving, at an apparatus, remote activity information from a remote measurement device and via a broadcast message, the remote activity information comprising an indication of remote activity type and remote measurement data, the broadcast message not being addressed to any particular recipient node;
in response to receipt of the broadcast message and a determination that a same property as the property indicated in the broadcast message can be performed by the apparatus, trigger a measurement of the same property to obtain a local measurement data;
verifying the local measurement data relating to the property of the entity and the remote measurement data to reflect a same measured entity and the same property at least in part by calculating a correlation between both the local measurement data and the remote measurement data;
processing the remote activity information with capability information relating to at least one of the apparatus and an application in the apparatus to determine whether at least one of the apparatus and the application are able to measure the same property of the same measured entity as the remote measuring device; and
generating an action in at least one of the apparatus and the application as a response to the processing.

13. The method of claim 12, further comprising: determining the local measurement data and the remote measurement data reflect the same measured entity; and in response to the determining, displaying an indication provided in a message.

* * * * *